United States Patent [19]

Papadopoulos et al.

[11] 3,710,069

[45] Jan. 9, 1973

[54] METHOD OF AND APPARATUS FOR SELECTIVE SOLDER REFLOW

[75] Inventors: John Papadopoulos, Burlington; David A. Prince, Richmond; Roger F. Reilly, Essex Center, all of Vt.

[73] Assignee: International Business Machines Corporation, Armonk, N.Y.

[22] Filed: July 6, 1970

[21] Appl. No.: 52,237

[52] U.S. Cl. ....................... 219/85, 29/487, 165/30, 219/347

[51] Int. Cl. ............................................ B23k 1/02

[58] Field of Search ..219/85, 347, 349, 354; 29/487, 29/498; 165/30, 133

[56] References Cited

UNITED STATES PATENTS

| | | | |
|---|---|---|---|
| 2,332,368 | 10/1943 | Burtenshaw | 29/487 |
| 3,283,124 | 11/1966 | Kawecki | 219/85 X |
| 2,768,595 | 10/1956 | Kalbow et al. | 29/487 X |
| 3,562,481 | 2/1971 | West | 219/85 |
| 3,465,116 | 9/1969 | Dix | 219/85 |

*Primary Examiner*—J. V. Truhe
*Assistant Examiner*—L. A. Schutzman
*Attorney*—Hanifin and Jancin

[57] ABSTRACT

A method of selective solder reflow in which an article to be reflowed is heated for a period of time sufficient to melt the solder, and at least one solder deposit which is not to be reflowed is cooled to prevent that solder from melting. In order to reduce temperature gradients in the article, the cooling is delayed until the heating has been applied.

14 Claims, 4 Drawing Figures

INVENTORS.
JOHN PAPADOPOULOS
DAVID A. PRINCE
ROGER F. REILLY

BY

Robert Oakes
AGENT

METHOD OF AND APPARATUS FOR SELECTIVE SOLDER REFLOW

BACKGROUND OF THE INVENTION

1. Field of the Invention

The invention relates to the field of solder reflow bonding and more particularly to the field of bonding semiconductor devices to substrates and bonding of substrates to other substrates by solder reflow techniques.

Throughout this specification selective solder reflow means reflowing (melting) at least one solder deposit on an article, but not melting all solder deposits on the article and a chip means an active semiconductor.

2. Prior Art

It is known in the art to focus radiant energy on articles to be solder reflow bonded to melt all the solder on the articles. The solder bonds the articles together when it resolidifies. The usefulness of this method is limited because all the solder is melted and all joints are subject to realignment or dislodging while the solder is melted and because all devices, even those already bonded, are elevated to high temperatures, which may be detrimental.

It is also known to have a non-reactive gas, such as $N_2$, flowing over a chip during a reflow step to form a curtain of non-oxidizing gas to prevent oxidation of the heated article and solder. The gas curtain surrounding the chip also cools any of the solder which flows out from under the chip along one of the conducting lands. Thus, the gas curtain prevents the solder, all of which melts, from flowing onto these lands which extend out beyond the edge of the chip.

In reflow bonding a chip to a substrate it is also known to use a flow of cooling gas across the top of a chip to prevent the characteristics of the chip from being adversely affected by the diffusion of surface metalizations, such as gold, into the adjacent areas of the semiconductor device during the heating cycle which melts all of the solder. This flow of cooling gas protects the upper surface of the chip from some detrimental effects of the high temperatures; however, all the solder is melted which raises the possibility of those devices being dislodged.

In the prior art, furnaces have been used for solder reflow bonding of semiconductor devices to substrates and for the bonding of one substrate to another. These furnaces require long periods for stabilization, must often be restricted to use for one product because of their temperature profile, and often produce quality output only when there is continuous through-put.

OBJECTS

The primary object of the present invention is to selectively reflow solder.

Another object of this invention is to allow high enough temperatures to be attained in selected solder deposits of an assembly to give reliable solder reflow joints, and allow very rapid cooling of the assembly to be carried out after the solder reflow joints have been formed.

Still another object of the invention is to reflow bond two substrates to each other while preventing a device solder reflow bonded on one of the substrates from being elevated to a high enough temperature to melt its solder bonds.

SUMMARY OF THE INVENTION

Selective solder reflow bonding is achieved by heating the articles to be joined and cooling at least one solder deposit which is not to be reflowed. Fluid cooling is preferred. The cooling fluid is prevented from reaching the joint to be reflowed by isolation means. For simplicity of structure, the isolation means is preferably the article itself.

The application of cooling to the solder deposits not to be reflowed is delayed until after heating of the solder deposits to be reflowed. This reduces temperature gradients in the assembly and therefore reduces the time any portion of the assembly must be at reflow temperatures.

Those joints directly exposed to the fluid cooling are not elevated to reflow temperatures. This method greatly reduces the length of time the article is exposed to detrimental temperatures, because rapid fluid cooling can be initiated at the end of the heating cycle, without dislodging any of the semiconductor devices directly exposed to the fluid cooling. This also reduces the adverse effects produced in semiconductor devices as a result of the high temperatures.

It is within the scope of this invention to have two or more solders with different melting points on the same article. The important feature is the use of cooling to prevent the reflow of a solder deposit which would reflow if it were not for the cooling.

The above and other objects and advantages of the invention will be apparent from the following more particular description of preferred embodiments of the invention, as illustrated in the accompanying drawings.

DETAILED DESCRIPTION

The method of the invention and a preferred embodiment will now be described in detail.

METHOD

In its broadest form the method of this invention involves heating an article to be reflowed for a time sufficient to melt the solder thereon, but cooling at least one solder deposit on the article at a sufficient rate and for a sufficient time to prevent the cooled solder deposit from melting.

The amount of cooling necessary depends on many factors, such as the temperature to which the article is heated, the size of the article, the thermal conductivity of the article, and the length of time for which the article is maintained at a temperature above the melting point of the solder. The most effective way of determining the amount of cooling necessary is to make a few trail runs while visually observing the solder deposits being cooled. For many articles it is important to minimize temperature gradients within the article. The temperature gradients are minimized by delaying the application of the cooling until after the heating has begun. The cooling is delayed until just prior to the time when the solder deposits not to be reflowed would melt in the absence of the cooling.

Where the article being reflowed can be damaged by long exposure to high temperatures it is desirable to continue the cooling beyond the point where the solder would no longer melt and/or to increase the rate of cooling after the solder to be reflowed has melted.

It is within the scope of the method to vary the heating and/or the cooling rates during the reflow cycle. To control temperature gradients, or for other purposes, it may be desirable to heat the article at one rate until a given temperature is reached and then to change the rate of heating and/or cooling.

As will be apparent from its description, the embodiment described below uses the method of the invention to selectively reflow solder.

THE PREFERRED EMBODIMENT

Figure 1:
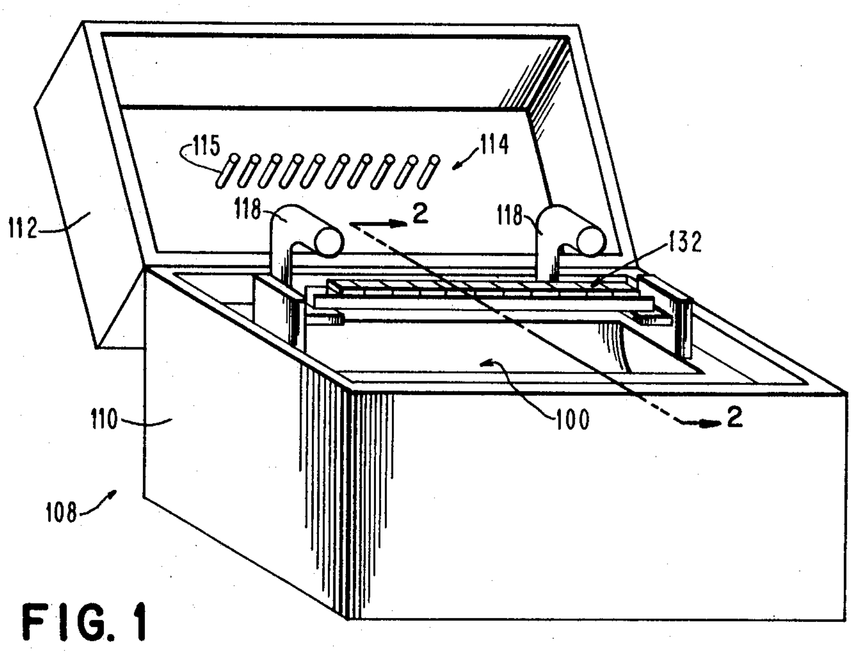
FIG. 1 is a diagram of a preferred automatic batch production solder reflow bonding system.

A batch production embodiment of this invention is shown in FIG. 1. The elements of the apparatus are heating means 100, and cooling means 114, which are attached to and supported by housing means 108. The heating means 100 is preferably long and extends beyond the ends of the batch of articles 132 to avoid temperature variations near the ends of the heating means. Cooling means 114 is located over the articles to be bonded.

Figure 2:
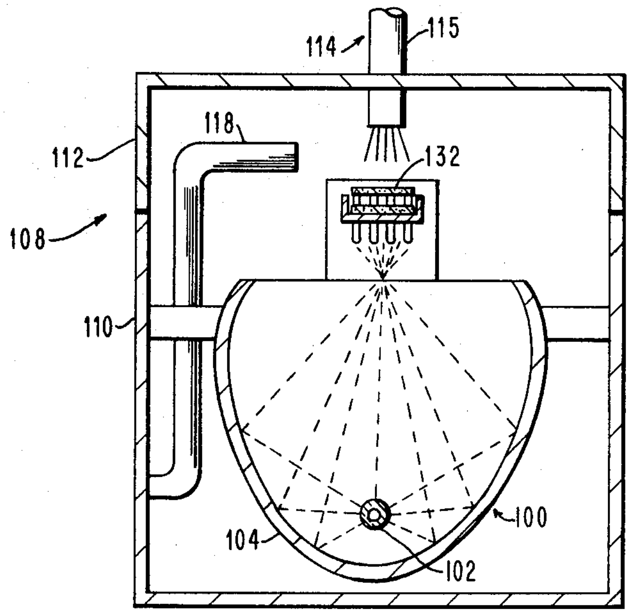
FIG. 2 is an enlarged cross section of the apparatus in FIG. 1 taken along the line 2—2, but with its cover closed.

As shown in FIG. 2, heating means 100 comprises a radiant heating lamp 102 and a reflector 104. Reflector 104 is placed to concentrate the radiant energy on the articles 132 which are being reflowed. In the preferred embodiment the radiant heating lamp is a long cylinder. The reflector has an elliptical cross section with the heating lamp 102 at one focus and the article 132 to be reflowed is displaced a short distance from the other focus so that the radiant energy encompasses the article. No articles are placed at the ends of the lamps because less radiant energy would strike the articles at the ends than strikes those near the middle. In the preferred embodiment cooling means 114 is comprised of a number of tubes 115 which direct an inert cooling fluid, such as $N_2$ gas, onto the upper surface of the articles 132. In order to minimize temperature gradients within the article and to prevent the solder on the upper surface of the article from reflowing, the cooling is activated just prior to the point where the solder bonds not to be reflowed would reach solder reflow temperatures. Housing 108 comprises a body 110 and a cover 112 in which cooling means 114 is mounted and contains exhausts 118 to vent the cooling fluid from the housing 108.

Figure 3:
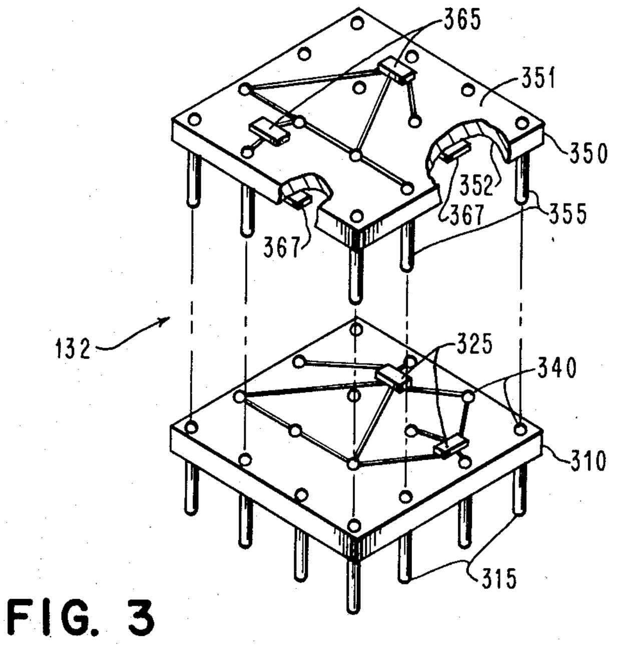
FIG. 3 is an enlarged, partially disassembled view of the article being bonded in FIGS. 1 and 2.

Articles 132 shown being processed in FIG. 1 are stacked modules made of two ceramic substrates mounted one on top of the other. One of the articles 132 being bonded is shown in more detail in partially disassembled form in FIG. 3. A lower substrate 310 is similar to an upper substrate 350 and the pins 355 on the upper substrate line up with and are in contact with the pins 315 on substrate 310. The two substrates are to be bonded together by solder reflow bonding of the joints between pins 355 and pins 315 at the points 340. Semiconductor devices 325 are solder reflow bonded on ceramic substrate 310. Semiconductor devices 365 are similarly solder reflow bonded to the upper surface 351 of ceramic substrate 350, and semiconductor devices 367 are on the lower surface 352 of substrate 350. It is desired to prevent the reflow of the bonds bonding semiconductor devices 365 to ceramic substrate 350 in order to allow rapid flow of cooling gas without blowing them away. The presence of a barrier (in this case, ceramic substrate 350) which prevents the cooling fluid from reaching the joints to be reflowed insures the quality of the product which is produced and relaxes the control tolerances on the flow of cooling fluid and on the amount of heat applied. These advantages are present because it is not necessary to provide a high degree of control of the cooling fluid flow rate in order to be certain that each portion of the article reaches and maintains the proper temperature for the proper amount of time. Similarly it is not necessary to control the applied heat as closely, since the cooling removes some of the heat, so that a slight excess of heat will not melt the bonds which are not to be reflowed.

Figure 4:
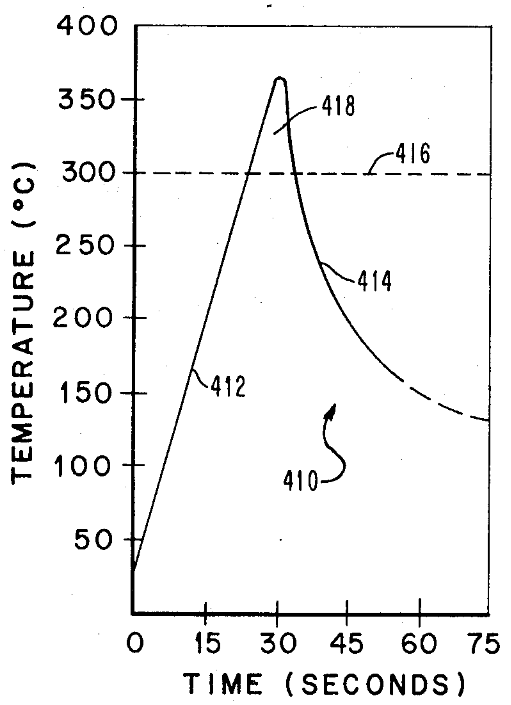
FIG. 4 is a temperature profile of a device being bonded in FIGS. 1 & 2.

The reflow cycle shown in FIG. 4 is for the purpose of bonding the upper substrate 350 to the lower substrate 310 by bonding pins 355 of substrate 350 to pins 315 of substrate 310. During the reflow bonding no reflow of the solder bonds joining chips 365 to the upper surface 351 of the substrate 350 is desired. Therefore, the cooling tubes 115 of FIGS. 1 and 2 broadcast the cooling fluid across the whole upper surface of the substrate 350. The bonds joining devices 367 to the lower surface 352 of the upper substrate 350 normally reflow, but the devices are retained in place by the adhesion of the solder to the devices 367 and the substrate 350.

Because no reflow takes place on the upper surface of the article, the article can be rapidly cooled by greatly increasing the cooling rate after the joints to be reflowed have reflowed. If the joints on the upper surface were allowed to reflow, individual semiconductor devices could be blown off the upper surface if a strong flow of the cooling fluid struck them before the resolidification of their solder bonds. Because in the preferred embodiment no reflow takes place on the upper surface, the cooling rate can be greatly increased as soon as the necessary solder reflow elsewhere has taken place. The increased cooling safely limits the maximum temperature reached by the substrates and the semiconductor chips on them. The length of time that a substrate or chip is above a given temperature is reduced because of the rapid cooling made possible by the method of this invention. The chips and the active devices in the chips are susceptible to deterioration from high temperatures as a result of diffusion of some of the materials contained therein. Therefore, the quality of the final product is improved by the reduced time during which diffusion can take place which limits changes in the device characteristics.

The cooling tubes 115 are shown as being tubular in FIGS. 1 and 2, however, the cooling means 114 may take many shapes and forms depending on the distribution of cooling fluid desired. If the substrates 310 and 350 are spaced from each other too great an extent, some of the cooling fluid would hit the upper surface of the lower substrate 310 of the stacked modules shown being reflowed in FIGS. 1 and 2. The cooling effect of this fluid may affect proper reflow and the strength of some of the joints, or may dislodge some chips whose joints have melted. It is for this reason that it is preferred to have the cooling fluid strike only the upper surface 351 of the substrate 350, and that in the preferred embodiment the articles to be bonded which forms a barrier to prevent the cooling fluid from reaching the region between the substrates 310 and 350. This barrier provides selective cooling, despite the general broadcast of the cooling fluid from cooling tubes 115 over the stacked modules. The means used to isolate the joints to be reflowed from the cooling fluid need not be part of the article. Instead a separate shield or skirt may be provided.

Using the method of this invention modules have been stacked having excellent strength characteristics. The total time during which devices on the lower substrate were above 150°C was less than 60 seconds, and the total time these devices were above 300°C was approximately 12 seconds with the peak temperature being approximately 365°C. The temperature of the devices on the upper substrate did not exceed the melting point (300°C) of the solder. In furnace stacking all the devices on both substrates are typically above 150°C for at least 360 seconds, above 300°C for 150 seconds and reach a peak temperature of 335°–355°C. Thus, the method of the invention is a significant improvement over furnace stacking, especially when the more sensitive devices can be located on the upper substrate and kept below 300°C. The curve 410 shown in FIG. 4 is the temperature profile experienced by a device on the upper surface of substrate 310 during the bonding of substrate 350 to substrate 310. Tests at different device sites indicate that substrate 310 is uniformly heated. The linear rising section 412 of the curve 410 corresponds to the time of exposure to radiant heat. The exponential dropping section 414 of curve 410 corresponds to the cooling cycle. The area 418 enclosed by the curve 410 and the 300°C line 416 is a measure of the absorbed energy which is particularly damaging to device metallurgy. This area 418 is at least an order of magnitude less than that experienced by a device on a substrate which is being bonded in a conventional furnace. The short time the device is at an elevated temperature is a result of delaying the application of the cooling until just prior to reflow of the solder bonding chips 365 to top surface 351 of substrate 350 and the rapid cooling provided by cooling means 114. This rapid cooling is possible because the delayed cooling prevents reflow of the joints on the upper surface 351 of the upper substrate 350 and rapid cooling can be instituted shortly after the heat is turned off without dislodging any devices. The quick cooling of the device is achieved by increasing the cooling rate after the heat has been turned off. The increased cooling rate is preferably provided by increasing the fluid flow rate.

Although the articles reach a higher peak temperature, 365°C, in this apparatus, than the 335°–355°C reached in conventional convection heated furnaces, the shorter time spent above 300°C (12 seconds vs. 150 seconds in conventional furnaces) and the shorter time above 150°C (less than 60 seconds vs. at least 360 seconds for the conventional furnace) more than compensate for the effects of the high temperature.

The method and apparatus of this invention are particularly useful for small articles which cannot be satisfactorily selectively soldered without the method of the invention because without cooling they cannot support the temperature gradients necessary to melt some of the solder deposits without melting all of the solder deposits.

The method of the invention can also be used in a continuous production embodiment. In a continuous production embodiment the articles 132 are transported over the heating means by a transport means. Delay of the cooling is achieved by having the cooling means 114 near the exit end of the heating zone.

Excellent quality product is obtained using the above method and apparatus. The quality is constant whether large or small batches are processed continuously or intermittently. Since the articles pass through the apparatus in single file, each article is subjected to the same conditions.

The above apparatus can be made much more compact than conventional furnaces with the same through-put, and unlike the conventional furnaces, requires no warm-up time.

While the invention has been particularly shown and described with reference to the preferred embodiment thereof, it will be understood by those skilled in the art that various changes in form and details of the apparatus and method may be made therein without departing from the spirit and scope of the invention and that the method is in no way restricted by the apparatus.

What is claimed is:

1. A method of selectively reflowing solder deposits on an article comprising the steps of:
   heating the article to melt at least one solder deposit on the article;
   cooling, during at least part of the heating step, at least a second solder deposit on the article due to said heating which would melt in the absence of the cooling to prevent the second solder deposit from melting.

2. The method of claim 1 wherein the cooling is by the flow of fluid.

3. The method of claim 2 wherein the cooling is by the flow of gas.

4. The method of claim 3 wherein the cooling step is delayed until after the beginning of the heating step.

5. The method of claim 3 wherein the cooling is increased after the solder to be melted has melted.

6. Apparatus for selectively reflowing solder deposits on an article comprising:
   heating means for heating at least one solder deposit on said article;
   cooling means for cooling at least a second solder deposit on said article in a zone substantially affected by said heating means to prevent reflow of that solder deposit; and
   means for controlling the activation of the cooling means to reduce temperature gradients in the apparatus.

7. The apparatus of claim 6 wherein the heating means is a source of radiant energy.

8. The apparatus of claim 6 wherein the article is positioned between the heating means and the cooling means.

9. The apparatus of claim 6 wherein the cooling means directs a cooling fluid onto the article.

10. The apparatus of claim 9 wherein isolation means for isolating the solder to be reflowed from the cooling fluid is disposed between the cooling means and the solder to be reflowed.

11. The apparatus of claim 10 wherein the isolation means is a portion of the article which forms a barrier to prevent the cooling gas from cooling the solder to be reflowed.

12. The apparatus of claim 6 wherein the cooling means directs a cooling gas onto the article.

13. The apparatus of claim 6 wherein the means for controlling the activation of the cooling means operates to delay the activation of the cooling means until after the heating starts.

14. The apparatus of claim 6 wherein the cooling means has at least two cooling rates, a first cooling rate being used during a first portion of the cooling step, and the second being applied during a second portion of the cooling step.

* * * * *